Nov. 10, 1959 H. A. MICHAELIS 2,912,557
ELECTRIC COOKING APPLIANCE
Filed Feb. 20, 1958 2 Sheets-Sheet 1

INVENTOR.
Harold A. Michaelis
BY
Smith, Prangley, Baird & Clayton
Attys.

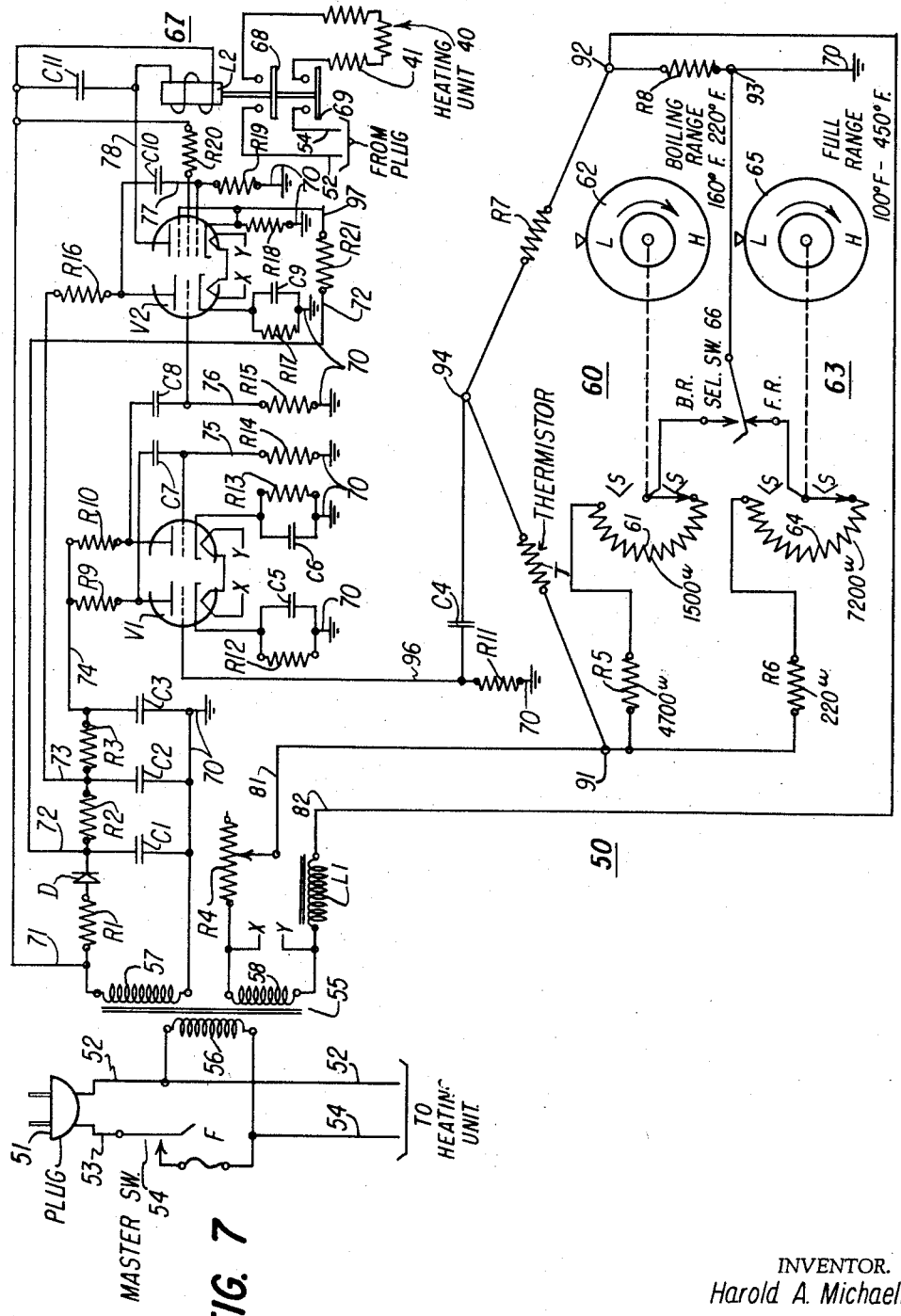

United States Patent Office 2,912,557
Patented Nov. 10, 1959

2,912,557
ELECTRIC COOKING APPLIANCE

Harold A. Michaelis, Elmhurst, Ill., assignor to General Electric Company, a corporation of New York Application February 20, 1958, Serial No. 716,339

11 Claims. (Cl. 219—20)

The present invention relates to an electric cooking appliance, and more particularly to an improved trunnion kettle and electric control circuit therefor.

It is a general object of the present invention to provide in a kettle, an improved electronic control circuit, so that the temperature of the contents of the kettle can be accurately controlled over the whole temperature range that is involved in the commercial cooking and preparing of foods from meat browning to deep-fat frying and embracing the overall temperature range from about 100° F. to about 450° F.

Another object of the invention is to provide in a kettle, an improved electronic control circuit that is arranged to effect a particularly accurate control of the temperature of the contents of the kettle in the boiling temperature range from about 160° F. to about 220° F.

A further object of the invention is to provide in a kettle, an improved control circuit that facilitates selective control over the full temperature range and over the boiling temperature range, so that substantially infinite adjustment or setting of the temperature in either of the temperature ranges mentioned can be made in a simple and ready manner.

A still further object of the invention is to provide a temperature control system of improved and simplified construction and arrangement which may be used with equal advantages in an electric trunnion kettle of the atmospheric or of the pressure cooker type.

Further features of the invention pertain to the particular arrangement of the elements of the kettle and of the electronic control circuit therefor, whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
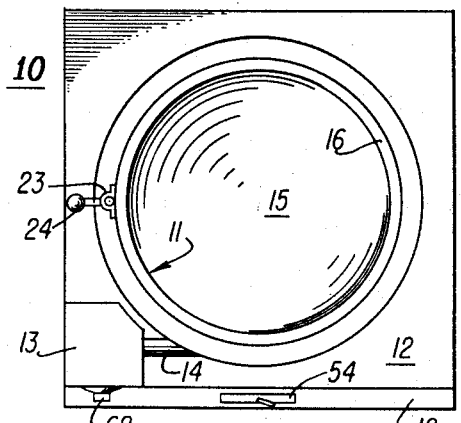
Figure 1 is a plan view of a trunnion kettle embodying the present invention.
Figure 3:
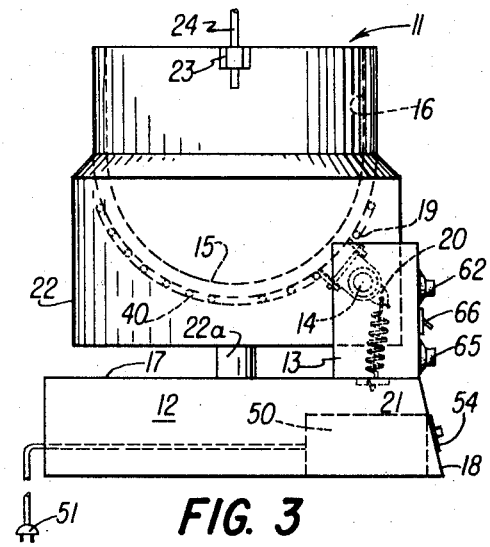
Fig. 3 is a side elevational view of the kettle shown in Figs. 1 and 2.
Figure 2:
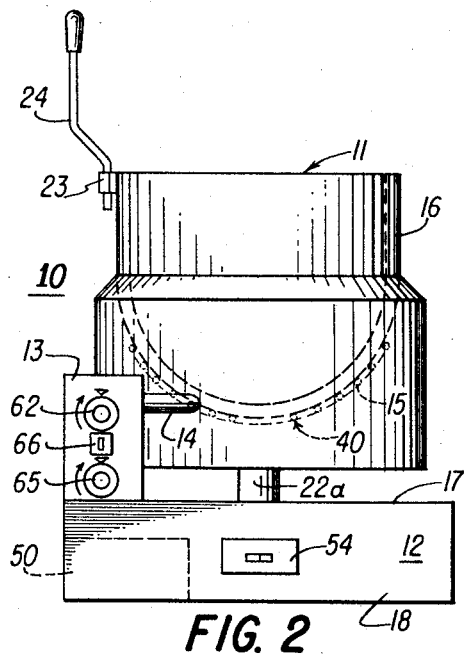
Fig. 2 is a front elevational view of the kettle shown in Fig. 1.
Figure 6:
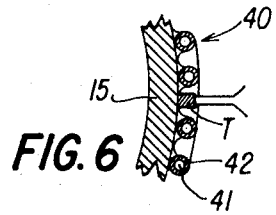
Figure 5:
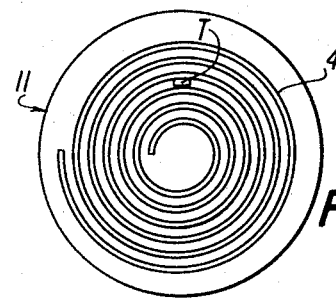
Fig. 5 is a bottom view of the kettle shown in Figs. 1 to 3, inclusive illustrating the electric heating unit carried upon the bottom wall thereof.

Fig. 6 is a greatly enlarged fragmentary sectional view of the bottom wall of the kettle, taken in the direction of the arrows along the line 6—6 in Fig. 5, illustrating the arrangement of the heating unit and the temperature-sensing element carried upon the exterior surface of the kettle; and Fig. 7 is a diagrammatic illustration of the component elements of the electronic control circuit for the kettle of Figs. 1 to 3, inclusive.

Referring now to Figs. 1 to 3, inclusive, of the drawings, the electric cooking appliance 10 there illustrated and embodying the features of the present invention is in the form of an atmospheric pressure type of trunnion kettle, especially designed for carrying out commercial cooking operations, and essentially comprises a jacketed kettle 11, a base 12 disposed below the kettle 11, a standard 13 carried by the top of the base 12 and adjacent to the front left-hand corner thereof, and a trunnion 14 extending between the kettle 11 and the standard 13. The kettle 11 includes a substantially hemispherical bottom wall 15 and an upstanding substantially cylindrical side wall 16 and having an open top. Preferably, the kettle 11 is of one-piece construction, being formed of metal having good thermal-condition properties, such for example, as aluminum. It is considered important that the kettle wall have substantial capacity for the distribution and conduction of the heat supplied thereto so as evenly to distribute the heat and thus avoid localized hot spots which would scorch or otherwise detrimentally affect the contents, and therefore the preferred form of the kettle comprises a drawn sheet of aluminum structure having a substantial wall-thickness of about ½ inch.

In the arrangement, the base 12 is of substantially box-like form, having a substantially equare top wall 17 and an upwardly sloping rectangular front wall 18. In the illustrated construction, the extreme outer end of the trunnion 14 is detachably secured to the adjacent exterior surface of the bottom wall of the kettle 11, employing a bracket, indicated generally at 19 in Fig. 3; while the inner end of the trunnion 14 is suitably mounted within the standard 13 for rotation through any desired number of intermediate positions within a total movement comprising an angle of 90°, so that the kettle 11 is rotatable therewith from its normal upstanding use position illustrated, into a selected forwardly tilted emptying position, not shown. The extreme rear end of the trunnion 14 carries a lug, indicated generally at 20 in Fig. 3, and disposed within the standard 13; which lug 20 forms a part of an over-center mechanism, not shown, arranged within the standard 13, and also including a coil spring, indicated generally at 21. This over-center mechanism restrains the trunnion 14 is either one of its extreme positions into which it is manually rotated by corresponding manual movement of the kettle 11 between its use position illustrated, and any emptying position, not shown. The details of the over-center mechanism, aside from the lug 20 and the coil spring 21, have not been illustrated in the interest of brevity, since this over-center mechanism may be of any well-known construction.

Further, the appliance 10 comprises a substantially cylindrical heat-insulating jacket 22 carried by the kettle 11 and enclosing the exterior surface of the bottom wall 15 and the immediately adjoining section of the side wall 16; whereby substantially one-half of the kettle is jacketed. The jacket 22 is suitably spaced from the bottom wall 15 to define a cavity within the jacket 22, which may provide dead-air insulation, or in which suitable insulating material, not shown, such as fiber glass, may be arranged. The bottom wall of the jacket 22 is also spaced above the top wall 17 of the base 12 so that there is no interference with the rotation of the kettle 11 between its two extreme positions with the trunnion 14, the jacket 22 being secured to the kettle 11 and movable therewith. The jacket 22 may be formed of sheet metal, or the like, so as to lend a general finished appearance to the appliance 10 in that it conceals the bottom portion 15 of the kettle 11 and the heating and control elements thereof, previously explained. Moreover, in the arrangement, the kettle 11 and the jacket 22 are disposed entirely over the top wall 17 of the base 12, when the kettle 11 occupies its normal use position, so as to prevent undesirable over-hanging operative parts with respect to the base 12. A post or support leg 22a provides a base for the kettle in its normal use position. Further, the kettle 11 is normally provided with a fixture 23 carried by the side wall 16 thereof adjacent to the open top thereof, to accommodate a handle 24 forming a convenient means for operating the kettle between a normal use position and a desired tilted position.

Figure 4:
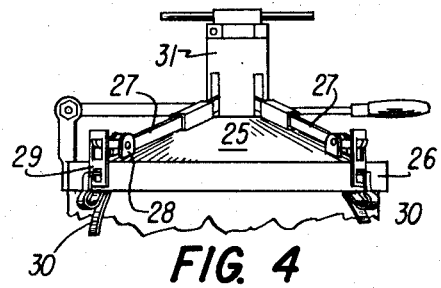
Fig. 4 is a fragmentary side elevational view of a kettle when equipped for pressure cooking.

Fig. 4 illustrates, in fragmentary side elevation, a kettle 11' equipped with a cover 25 arranged in pressure-tight relation therewith, whereby the kettle may be used for pressure cooking. The cover 25 may be applied in the manner shown in Jacobs U.S. Patent No. 1,799,905. That is to say, it may be detachably latched to a flange 26 about the upper rim of the kettle by means comprising the radial arms 27 which are pivotally mounted in the lugs 28 and releasably engage with the links 29 and latching means 30 cooperating with the flange 26. The arms 27 are in an articulated relationship with an actuator assembly 31, whereby to insure an adjustable pressure-tight joint between the cover and the kettle, and to provide for the ready removal of the cover, as fully disclosed in the Jacobs patent. It is preferred that the cover be completely removable from the kettle instead of being hingedly secured thereto. It will be understood that the usual air-venting and pressure relief means (not shown) will be provided.

Further, the appliance 10 comprises an electric heating unit 40 of the sheathed helical resistance conductor type disclosed in U.S. Patent No. 1,367,341, granted on February 1, 1921 to Charles C. Abbott; which heating unit 40 essentially comprises, as indicated in Fig. 5, a helical resistance conductor 41, a tubular metal sheath 42 enclosing the resistance conductor 41, and an intermediate mass of highly compacted heat-conducting and electrical-insulating material, such as magnesia, arranged between the resistance conductor 41 and the sheath 42. In the present arrangement, it is preferable that the sheath 42 be formed of aluminum; and the heating unit 40 is wound in general spiral-like or coil form, as illustrated in Fig. 4 and applied directly to the exterior surface of the bottom wall 15 of the kettle 11. More particularly, the sheath 41 is directly secured and/or substantially clamped in place to the adjacent exterior surface of the bottom wall 15 in good heat-exchange relation therewith. Advantageously, the sheath is affixed to the vessel by brazing, or the like, although means for clamping such heating units to the wall of a cooking vessel are well-known in the art and may be employed.

Also, the appliance 10 comprises a temperature-sensing element T that is preferably in the form of a thermistor that is also applied to the exterior surface of the bottom wall 15 and directly secured in place thereupon, in any suitable manner. More particularly, the thermistor T is arranged between two adjacent turns or coil-sides of the heating unit 40 and in spaced-apart relation with respect thereto and directly secured to the adjacent exterior surface of the bottom wall 15, whereby the thermistor T is in good heat-exchange relation with both the bottom wall 15 and the heating unit 40. The thermistor T has a high negative temperature coefficient of resistance and may be of ceramic-like composition consisting of sintered aluminum oxide, and an oxide of magnesium, manganese, titanium, iron, nickel, cobalt, zinc, etc. For example, the thermistor T may have the exceedingly high negative temperature coefficient of resistance corresponding to a resistance rate of change of −0.044 ohm/ohm/° C.; whereby the characteristic of the thermistor may be as follows:

| Temperature (° C.) | Total resistance (ohms) |
|---|---|
| 25 | 100,000 |
| 50 | 34,000 |
| 100 | 6,000 |
| 150 | 1,700 |
| 200 | 580 |

Of course, the heating unit 40 and the temperature sensing element or thermistor T are enclosed within the heat-insulating jacket 22; whereby the elements 40 and T are movable with the kettle 11 between its two operative positions. Moreover, the elements 40 and T are suitably connected by flexible wiring, not shown, to an electronic circuit control unit 50 that may be housed within the base 12; which flexible wiring mentioned accommodates movements of the elements 40 and T with the kettle 11, without interference with the unit 50. For example, the trunnion 14 may be of tubular form, and the flexible wiring mentioned may be disposed fundamentally within the tubular trunnion 14 so that it is not damaged, or otherwise impaired, by the relative movements between the kettle 11 and the base 12, and a sufficient excess of wiring is provided for the removal of the unit from the base 12 without the necessity of breaking the electrical connections therein.

Referring now to Fig. 7, the electronic control circuit unit 50 there illustrated comprises, in addition to the heating unit 40, the resistance conductor 41 thereof being illustrated, and the thermistor T, a transformer 55 provided with a soft iron core carrying a primary winding 56 and two secondary windings 57 and 58. Also the unit 50 comprises a plug 51 that is connectible to a suitable source of A.-C. power supply and provided with a pair of lines 52 and 53. A master switch 54 and a fuse F are arranged in series relation between the line 53 and a conductor 54; and the primary winding 56 is bridged across the line 52 and the conductor 54. The secondary winding 57 is bridged across a pair of conductors 70 and 71, the conductor 70 being connected directly to ground potential; and the secondary winding 58 is bridged across a pair of filament supply conductors X and Y.

Further, the unit 50 comprises a relay 67 including an operating winding L2 that cooperates with an armature carrying a contact actuating member provided with two contact bridging members 68 and 69. The contacts associated with the contact bridging member 68 are respectively connected to the line 52 and to one terminal of the resistance conductor 41; and the contacts associated with the contact bridging member 69 are respectively connected to the conductor 54 and to the other terminal of the resistance conductor 41. The conductor 71 is connected via a resistor R1 and a rectifying diode D to a conductor 72; the conductor 72 is connected via a resistor R2 to a conductor 73; and the conductor 73 is connected via a resistor R3 to a conductor 74. The conductors 72, 73 and 74 are respectively connected via capacitors C1, C2 and C3 to the ground conductor 70.

Further, the unit 50 comprises a manually operable control device 60 for selectively setting the operating temperature of the kettle 11 in the boiling temperature range extending from about 160° F. to 220° F., and a manually operable control device 63 for selectively setting the operating temperature of the kettle 11 in the full temperature range extending from about 100° F. to 450° F., as well as a selector switch 66 of the two-position type respectively selecting one or the other of the devices 60 and 63. The device 60 comprises an adjustable resistor 61 provided with a cooperating adjusting wiper mounted upon a rotatable shaft that may be selectively set by an associated rotatable dial 62 cooperating with an associated index marker. The individual control device 60 in the boiling range of operation makes it possible widely to space the temperature markings on the dial, thus facilitating the selection of the control temperature. Similarly, the device 63 comprises an adjustable resistor 64 provided with a cooperating adjusting wiper mounted upon a rotatable shaft that may be selectively set by an associated rotatable dial 65 cooperating with an associated index marker. The selector switch 66 comprises a contact arm operable between a lower position engaging a contact connected to the wiper of the resistor 64, and an upper position engaging a contact connected to the wiper of the resistor 61; whereby the selector switch 66 in its lower position illustrated selects the device 63, and the selector switch 66 in its upper position, not illustrated, selects the device 60. The resistor 61 is connected in series relation with a resistor R5; and the resistor 64 is connected in series relation with a resistor R6.

A Wheatstone bridge is provided that includes a pair of input terminals 91 and 92 and a pair of output terminals 93 and 94. In the arrangement, the input terminal 91 is connected via the thermistor T to the output terminal 94, and the input terminal 92 is connected via a resistor R7 to the output terminal 94. Also the input terminal 91 is connectible via the resistor R5 and the resistor 61 and the selector switch 66 to the output terminal 93; and further, the input terminal 91 is connectible via the resistor R6 and the resistor 64 and the selector switch 66 to the output terminal 93. Finally, the input terminal 92 is connected via a resistor R8 to the output terminal 93. The input terminal 91 is connected via a conductor 81 to the wiper of an adjustable resistor R4 and thence to one terminal of the secondary winding 58; and the input terminal 92 is connected via a conductor 82 and an inductive choke or reactor L1 to the other terminal of the secondary winding 58. Further, the output terminal 93 is connected directly to the ground conductor 70, while the output terminal 94 is isolated from ground potential for a purpose more fully explained hereinafter.

Again referring to Figs. 1 to 3, inclusive, of the drawings, it will be noted that the master switch 54 may be mounted upon the front wall 18 of the base 12, while the manually adjustable dials 62 and 65 of the respective devices 60 and 63, as well as the operating element of the selector switch 66, may be mounted upon the front face of the standard 13; whereby all of the operative elements that require manual adjustment are readily accessible to the cook. Furthermore, the cord or cable in which the lines 52 and 53 are arranged may project from the rear wall of the base 12 and terminate in the plug 51 that may be connected to an associated socket terminating a suitable source of A.-C. supply.

A present embodiment of the invention employs a vacuum tube amplifier circuit, although magnetic or other amplifier types may be used. Again referring to Fig. 7, the amplifier circuit comprising the unit 50 includes a vacuum tube V1 of the dual-triode type and a vacuum tube V2 of the triode-pentode type. In the tube V1: the left anode is connected via a resistor R9 to the conductor 74; the left cathode is connected via a resistor R12 to the ground conductor 70; the left control grid is connected to a conductor 96 that is connected via a resistor R11 to the ground conductor 70; the right anode is connected via a resistor R10 to the conductor 74; the right cathode is connected via a resistor R13 to the ground conductor 70; and the right control grid is connected to a conductor 75 that is connected via a resistor R14 to the ground conductor 70. In the tube V2: the left anode is connected via a resistor R16 to the conductor 73; the left cathode is connected via a resistor R17 to the ground conductor 70; the left control grid is connected to a conductor 76 that is connected via a resistor R15 to the ground conductor 70; the right anode is connected to a conductor 78; the right cathode is connected via a resistor R18 to the ground conductor 70; the right control grid is connected to a conductor 77 that is connected via a resistor R19 to the ground conductor 70; the right screen grid is connected via a resistor R20 to the conductor 71; and the right suppressor grid is connected to the right cathode and to a conductor 97 that is connected via a resistor R21 to the conductor 72.

Further, the output terminal 94 is connected via a capacitor C4 to the conductor 96 and thus to the left control grid of the tube V1. The left anode of the tube V1 is connected via a capacitor C7 to the conductor 75, and the right anode of the tube V1 is connected via a capacitor C8 to the conductor 76. The left anode of the tube V2 is connected via a capacitor C10 to the conductor 77; and the winding L2 of the relay 67 is bridged across the conductors 71 and 78, together with a capacitor C11. Further, the resistors R12, R13 and R17 are respectively bridged by filtering capacitors C5, C6 and C9; the heaters operatively associated with the thermionic cathodes of the tube V1 are connected in series relation and bridged across the filament supply conductors X and Y; and the heaters operatively associated with the thermionic cathodes of the tube V2 are connected in series relation and bridged across the filament line conductors X and Y.

In the circuit arrangement, the resistor R5 may have a resistance of 4700 ohms and the resistor 61 connected in series circuit relation therewith may have a resistance of 1500 ohms; whereby the overall resistance of this leg of the bridge may be adjusted between 4700 ohms and 6200 ohms depending upon the position of the manual dial 62 and corresponding to the boiling temperature range extending from about 160° F. to 220° F. The resistor R6 may have a resistance of 220 ohms and the resistor 64 connected in series relation therewith may have a resistance of 7200 ohms; whereby the overall resistance of this leg of the bridge may be adjusted between 220 ohms and 7420 ohms depending upon the position of the manual dial 65 and corresponding to the full temperature range extending from about 100° F. to 450° F.

Considering now the general mode of operation of the appliance 10, when the master switch 54 is closed, the primary winding 56 is energized and the circuit for energizing the heating element 41 of the heating unit 40 is prepared; and at this time, it may be assumed that the kettle 11 and its contents are cold. Also, it is assumed that the heating of the contents of the kettle 11 is to take place somewhere in the full temperature range; whereby the selector switch 66 is operated to its lower position selecting the device 63, and the manual dial 65 is adjusted somewhere in the full temperature range thereby effecting the required adjustment of the resistor 64. The secondary winding 58 is energized causing an alternating voltage to be applied across the input terminals 91 and 92 of the bridge and traversing the leg including the resistors R6 and 64 so that an output voltage appears between the output terminals 93 and 94 of the bridge. As previously noted, the output terminal 93 is connected to the ground conductor 70, whereby the control potential appears between the output terminal 94 and ground potential as established by the ground conductor 70. Also, the secondary winding 57 is energized, whereby an alternating voltage appears between the conductor 71 and the ground conductor 70, and the diode D is operative to accomplish rectification so that direct voltages of progressively reduced values are impressed upon the conductors 72, 73 and 74 with respect to ground potential as established by the ground conductor 70.

When the thermistor T is cool, it has a very high resistance as previously explained, whereby the bridge is unbalanced so that a high negative potential appears upon the output terminal 94 concurrently with the positive running loops of the power output voltage of the secondary winding 57 as applied to the conductor 71 and extending via the winding L2 of the relay 67 to the conductor 78 and thence to the anode of the right pentode of the tube V2. Accordingly, the high negative potential applied to the output terminal 94 at this time effects the application of a high negative bias to the left control grid of the left triode of the tube V1, whereby the left triode of the tube V2 is rendered substantially non-conductive effecting unloading of the resistor R9 with the result that a substantially reduced negative bias is applied to the right control grid of the tube V1 so that the right triode of the tube V1 is rendered substantially conductive effecting loading of the resistor R10. This loading of the resistor R10 causes a high negative bias to be applied to the left control grid of the tube V2, whereby the left triode of the tube V2 is rendered substantially non-conductive effecting unloading of the resistor R16 with the result that a substantially reduced negative bias is applied to the right control grid of the tube V2 so that the right pentode of the tube V2 is rendered substantially conductive effecting substantial energization of the winding L2 of the relay 67. Accordingly, the relay 67 operates closing the bridging members 68 and 69, with the result that the heating element 41 of the heating unit 40 is energized between the line 52 and the conductor 54, and thus across the lines 52 and 53 with the master switch 54 in its closed position.

The heating of the heating unit 40 effects corresponding heating of the kettle 11 and its contents, as well as heating of the thermistor T, whereby the resistance of the thermistor T is reduced as the temperature thereof is increased so that the unbalance of the bridge is less severe as time proceeds and as the temperature of the thermistor T approaches that set by the device 63. Still later, when the temperature of the kettle 11 and its contents reaches the desired and preset temperature established by the device 63, the bridge is placed in a reverse condition of unbalance, so that a high positive potential appears upon the output terminal 94 concurrently with the positive running loops of the power output voltage of the secondary winding 57 as applied to the conductor 71. Accordingly, the high positive potential applied to the output terminal 94 at this time drives the left triode of the tube V1 to substantial conduction, with the result that the right triode of the tube V2 is driven substantially to cutoff. Accordingly, the left triode of the tube V2 is driven to substantial conduction with the result that the right pentode of the tube V2 is driven substantially to cutoff, so that the winding L2 of the relay 67 is effectively deenergized causing the latter relay to restore, with the result that the contact bridging members 68 and 69 interrupt the circuit for energizing the heating unit 40.

At this point, it is mentioned that the relay 67 is of the marginal type so that when the winding L2 thereof is energized with less than 3 ma., the armature is released, the winding L2 being normally biased with a current of about 2.4 ma., when the right pentode of the tube V2 is driven substantially to cutoff as previously noted.

Accordingly, at this time, the heating of the heating unit 40 is arrested so that the kettle 11 and its contents begin to cool somewhat, with the result that the resistance of the thermistor T is increased as the temperature thereof is reduced. Subsequently these conditions will bring about the previously described reverse control of the tubes V1 and V2, with the result that the winding L2 of the relay 67 is energized with adequate current to cause the relay 67 to reoperate, so as again to effect heating of the heating unit 40. In view of the foregoing, it will be understood that the relay 67 alternately operates and restores as the temperature of the kettle 11, as sensed by the thermistor T, alternately falls below and rises above the preset temperature, as set by the device 63.

In the foregoing description of the mode of operation of the control circuit, the fundamental explanation of the controls was set forth with respect to the sign and the amplitude of the alternating control voltage appearing upon the output terminal 94 concurrent with the positive running loops of the power output voltage as applied to the conductor 71. However, there is still another control that is brought about by the control circuit that concerns phase considerations of these two alternating voltages. More particularly, the alternating current that is supplied to the input terminals 91 and 92 of the Wheatstone bridge from the secondary winding 58 also traverses the resistor R4 and the reactor L1, whereby the alternating voltage as applied to the input terminals 91 and 92 is shifted in phase with respect to the alternating voltage that is applied between the conductor 71 and the ground conductor 70. More specifically, the alternating voltage applied to the input terminals 91 and 92 lags somewhat the alternating voltage applied between the conductor 71 and the ground conductor 70; and the initial phase angle of this difference in voltages can be suitably controlled by adjusting the resistor R4, so as initially to set the resulting current bias of the winding L2 of the relay 67. Accordingly, in the subsequent operation of the control circuit, as the temperature of the kettle 11 varies, the resistance of the thermistor T1 varies, as previously explained; whereby the impedance of the bridge is varied, with the result that the reactor L1 is more or less effective, depending upon the resistance of the bridge, with the result that there is a corresponding variation in the phase shift of the alternating voltage appearing upon the output terminal 94 with respect to the alternating voltage appearing upon the conductor 71. Since the right pentode of the tube V2 is conductive only during the positive running loops of the alternating voltage applied to the conductor 71, the phase of the amplified controls as determined by the alternating voltage appearing upon the output terminal 94 also controls the conduction of the right pentode of the tube V2. Hence, the ultimate control of the conduction of the right pentode of the tube V2, and consequently the position of the relay 67, is governed jointly by the sign and amplitude of the alternating voltage appearing upon the output terminals 94 during the positive running loops of the alternating voltage appearing upon the conductor 71, and also by the phase angle between the two voltages mentioned; and of course, as explained above, the resistance of the thermistor T effects the variations mentioned in accordance with the temperature thereof, as established by the temperature of the kettle 11 and its contents.

Now assuming that the heating of the contents of the kettle 11 is to take place somewhere in the boiling temperature range, the selector switch 66 is operated into its upper position selecting the device 60, and the manual dial 62 is adjusted somewhere in the boiling temperature range, thereby effecting the required adjustment of the resistor 61. In this case, the secondary winding 58 is energized causing an alternating voltage to be applied across the input terminals 91 and 92 of the bridge, and traversing the leg including the resistors R5 and 61, so that the output voltage appears between the terminals 93 and 94 of the bridge. The remainder of the operation of the control circuit in order to effect alternate operation and restoration of the relay 67 in accordance with the preset temperature established by the device 60 is the same as that previously described.

In passing, it is noted that during the negative running loops of the power output voltage of the secondary winding 57 as applied to the conductor 71, the right pentode of the tube V2 is rendered non-conductive; however, the winding L2 of the relay 67 is energized therein by the discharge of the capacitor C11 connected in parallel relation with the winding L2, since the capacitor C11 is charged in parallel with the direct energization of the winding L2 on the positive running loops of the power output voltage of the secondary winding 57 as applied to the conductor 71, when the right pentode of the tube V2 is conductive. Accordingly, the relay 67 does not hunt (alternately operate and restore) during alternate conductions of the right pentode of the tube V2 when the bridge is in a heat-demand position.

Recapitulating: when the selector switch 66 occupies its lower position, the device 63 is selected and connected into the associated bridge so that the control circuit is operative to effect heating of the heating unit 40 in order to maintain the preset temperature of the kettle 11 as established by the device 63. On the other hand, when the selector switch 66 occupies its upper position, the device 60 is selected and connected into the associated bridge so that the control circuit is operative to effect heating of the heating unit 40 in order to maintain the preset temperature of the kettle 11 as established by the device 60. Of course, the full scale of the dial 65 of the device 63 is calibrated to the full temperature range of the kettle 11; whereas the full scale of the dial 62 of the device 60 is calibrated to the boiling temperature range of the kettle 11. This arrangement insures an exceedingly accurate control of the temperature of the kettle 11 in the boiling temperature range thereof, as well as an accurate control of the temperature of the kettle 11 in the full temperature range thereof. These temperature controls are substantially infinitely adjustable over the temperature ranges involved, thereby guaranteeing an exceedingly small variation in the temperature of the kettle 11 and its contents from that preset by the particular device 60 or 63 that is selected by the selector switch 66.

Moreover, in the arrangement, there is exceedingly good heat exchange between the sheath 42 of the heating unit 40 and the bottom wall 15 of the kettle 11 and an exceedingly effective heat distribution pattern, whereby with almost complete disregard of the actual quantity of the contents of the vessel, there are no localized hot spots and practically no overshoot in the temperature of the contents after the current to the heating unit is interrupted. Also because the temperature-sensing element or thermistor T is in good heat exchange relation with the bottom wall 15 of the kettle 11 and with the sheath 42 of the heating unit 40 so as to be subject to wide amplitudes of temperature as the heating unit cycles, the response is very prompt and there is substantially no overshoot of the temperature or undershoot of the temperature with respect to the preset temperature under the control of either of the devices 60 or 63.

In the control circuit, an overall voltage gain of 80:1 may be realized in the tube V1; a voltage gain of 15:1 may be realized in the left triode of the tube V2; and in the right pentode of the tube V2 current amplification and control of the relay 67 are effected.

Of course, in order to arrest operation of the kettle 11, it is only necessary to open the master switch 54 thereby interrupting the circuit for energizing the heating unit 40 and interrupting the circuit for energizing the primary winding 57, so as positively to insure the restoration of the relay 67. Further, it will be understood that the fuse F occupies a series position in the parallel circuits for energizing the heating unit 40 and the primary winding 56 with the result that the electrical system is protected against overcurrent.

In a typical embodiment of the appliance, the kettle 11 may have a capacity of 2½ gallons, the internal diameter of the side wall thereof being about 12" and the overall height about 9.75". The heat distribution described above is obtained by using a heating unit 40 which is about 88 inches in length, having a rating of 5000 watts, and arranged so as to provide uniform heating effect over an area which extends to a level 3.25" above the bottom of the hemispherical portion 15. A similar arrangement and disposition of the heating unit is employed in the pressure-cooking embodiment of Fig. 4, in which embodiment the accuracy of temperature control obtainable in the present invention is of particular value in that changes in temperature are immediately manifested by changes in pressure. Of course, the dimensions of the kettle and the physical characteristics of the heating unit may be increased to provide greater capacities of the kettle.

It is an important feature of the invention that the good heat conductivity of the metal of the kettle 11, both as to actual coefficient of conductivity and the substantially unrestricted heat path afforded by the wall thickness, provides for heating the lower one-third of the kettle to substantially the same temperature between and over the convolutions of the heating element; and the substantially unrestricted heat flow along the sides of the kettle extracts the heat from the directly heated bottom portion of the kettle. It will be noted that the jacket 22 extends upwardly for only about one-half of the height of the kettle, whereby heat loss from the kettle is deliberately increased. It is well-known that in directly heated kettles of earlier construction, not having the thermal transfer and conduction relationships above discussed, there was a tendency to scorch the top layer of the contents of the vessel for there was a more efficient heat flow from the wall of the vessel into the contents of the free surface thereof, than through the uncovered vessel wall above the contents. Pursuant to the present invention, any uncovered kettle wall area above the contents provides for an escape of heat into the atmosphere, thus protecting the contents against overheating.

In view of the foregoing, it is apparent that there has been provided an improved and simplified trunnion kettle and electronic control circuit therefor embodying accurate control of the temperature of the kettle in the full temperature range thereof and exceedingly accurate control of the temperature of the kettle in the boiling temperature range thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric cooking appliance comprising a kettle formed of metal having good thermal conductivity and including a bottom wall and an upwardly directed side wall, a base disposed below said kettle and mounting the same thereon for pivotal movements between an upstanding position and a substantially tilted position, an electric heating unit of the type including a resistance conductor and an enclosing metal sheath, said sheath being directly secured to the exterior surface of said bottom wall in good heat-exchange relation therewith, whereby said heating unit is movable with said kettle, a temperature-sensing element directly secured to the exterior surface of said bottom wall in good heat-exchange relation therewith and with said heating unit and movable with said kettle, a heat-insulating jacket carried by said kettle and movable therewith and enclosing said bottom wall and said heating unit and said temperature-sensing element, a source of electric power, a manually operable temperature-setting device, and means governed jointly by said temperature-sensing element and by said temperature-setting device for selectively controlling the supply of power from said source to the resistance conductor of said heating unit, so as to maintain the temperature of the contents of said kettle substantially at that set by said temperature-setting device.

2. The electric cooking appliance set forth in claim 1, wherein both said kettle and said sheath are formed essentially of aluminum, and said sheath is directly brazed to the exterior surface of said bottom wall, so as to minimize the temperature gradient therebetween.

3. The electric cooking appliance set forth in claim 1, wherein said sheath is of open coil-like form with adjacent coil sides thereof disposed in spaced-apart relation and directly secured to the exterior surface of said bottom wall, and said temperature-sensing element is located between two adjacent coil sides of said sheath in spaced-apart relation therewith and directly secured to the exterior surface of said bottom wall.

4. The electric cooking appliance set forth in claim 1, wherein said temperature-sensing element essentially comprises a thermistor.

5. An electric cooking appliance comprising a kettle formed of metal having good thermal conductivity and including a substantially hemispherical bottom wall and a substantially cylindrical upwardly directed side wall, a base disposed below said kettle, trunnion mounting means for supporting said kettle upon said base for pivotal movements with respect thereto between an upstanding position and a forwardly tilted position, an electric heating unit of the type including a resistance conductor and an enclosing metal sheath, said sheath being of open coil-like form with adjacent coil sides thereof disposed in spaced-apart relation and directly secured to the exterior surface of said bottom wall in good heat-exchange relation therewith, whereby said heating unit is movable with said kettle, said bottom wall having a thickness of about ½ inch and said sheath embracing a substantial portion of said bottom wall, so as to effect a substantially uniform distribution of heat over said bottom wall, a temperature-sensing element directly secured to the exterior surface of said bottom wall in good heat-exchange relation therewith and with said heating unit and movable with said kettle, a heat-insulating jacket carried by said kettle and movable therewith and enclosing said bottom wall and said heating unit and said temperature sensing element, so as to minimize the escape of heat from said heating unit and said bottom wall to the exterior, a source of electric power, and means including said temperature-sensing element for controlling the supply of power from said source to the resistance conductor of said heating unit.

6. An electric cooking appliance comprising a kettle formed of metal having good thermal conductivity and including a substantially hemispherical bottom wall and a substantially cylindrical side wall extending upwardly therefrom, an electric heating unit of the type including a resistance conductor and an enclosing metal sheath, said sheath being of open coil-like form with adjacent coil sides thereof disposed in spaced-apart relation and directly secured to the exterior surface of said bottom wall in good heat-exchange relation therewith, said bottom wall having a thickness of about ½ inch and said sheath embracing a substantial proportion thereof, so as to effect a substantially uniform distribution of heat over said bottom wall, a temperature-sensing element directly secured to the exterior surface of said bottom wall in good heat-exchange relation therewith and with said heating unit and movable with said kettle, a heat-insulating jacket carried by said kettle and enclosing said bottom wall and said heating unit and said temperature-sensing element, so as to minimize the escape of heat from said heating unit and said bottom wall to the exterior, said side wall having a thickness of about ½ inch and projecting upwardly well above said bottom wall and out of said jacket and well thereabove, so as to facilitate the escape of heat therefrom to the exterior in order to effect cooling thereof to a temperature well below that of said bottom wall, thereby to prevent scorching of the surface layer of a food product being cooked in said kettle, a source of electric power, and means including said temperature-sensing element for controlling the supply of power from said source to the resistance conductor of said heating unit.

7. The electric cooking appliance set forth in claim 6, wherein said kettle has an overall height $h$, said heating unit extends upwardly a distance of about $\frac{1}{3} h$, and said side wall projects upwardly out of said jacket about $\frac{1}{2} h$.

8. An electric cooking appliance comprising a kettle formed of metal having good thermal conductivity and including a bottom wall and an upwardly directed side wall, a base disposed below said kettle and mounting the same thereon for pivotal movements between an upstanding position and a substantially tilted position, an electric heating unit of the type including a resistance conductor and an enclosing metal sheath, said sheath being directly secured to the exterior surface of said bottom wall in good heat-exchange relation therewith, whereby said heating unit is movable with said kettle, a temperature-sensing resistor directly secured to the exterior surface of said bottom wall in good heat-exchange relation therewith and with said heating unit and movable with said kettle, a heat-insulating jacket carried by said kettle and movable therewith and enclosing said bottom wall and said heating unit and said temperature-sensing resistor, a source of electric power, a first control resistor variable over a given resistance range corresponding to the full temperature range of said kettle, a first manually operable control device for selectively setting the resistance of said first control resistor within its range, a second control resistor variable over only a part of said given resistance range corresponding to only a part of said full temperature range of said kettle, a second manually operable control device for selectively setting the resistance of said second control resistor within its range, a two-position control switch selecting said first control resistor in a first of its positions and selecting said second control resistor in a second of its positions, a bridge circuit connecting said temperature-sensing resistor in paired relation with the selected one of said control resistors, whereby said bridge circuit is governed jointly by said temperature-sensing resistor and by the selected one of said control resistors, and means governed by said bridge circuit for selectively controlling the supply of power from said source to the resistance conductor of said heating unit.

9. An electric cooking appliance comprising a kettle formed of metal and including a bottom wall and an upwardly directed side wall and having an open top, a hollow base disposed below said kettle, a standard carried by said base, a trunnion fixed at its outer end to said kettle and rotatably mounted at its inner end upon said standard, so that said kettle is mounted for pivotal movements between an upstanding position and a substantially tilted position, an electric heating unit of the type including a resistance conductor and an enclosing metal sheath, said sheath being directly secured to the exterior surface of said bottom wall in good heat-exchange relation therewith, whereby said heating unit is movable with said kettle, a temperature-sensing element directly secured to the exterior surface of said bottom wall in good heat-exchange relation therewith and with said heating unit and movable with said kettle, a heat-insulating jacket carried by said kettle and movable therewith and enclosing said bottom wall and said heating unit and said temperature-sensing element, a manually operable temperature-setting device carried by said standard, and a power supply unit arranged in said base and connectible to a source of electric power, said unit being governed jointly by said temperature-sensing element and by said temperature-setting device selectively to control the supply of power from said source to the resistance conductor of said heating unit, so as to maintain the temperature of the contents of said kettle substantially at that set by said temperature-setting device.

10. The cooking appliance set forth in claim 9 wherein said standard houses over-center mechanism restraining said kettle in either one of its positions into which it is manually moved.

11. In an electric heating system including an electric heating unit, a medium arranged in good heat-exchange relation with said heating unit, and a source of A.-C. electric power; the combination comprising a temperature-sensing resistor having a high temperature coefficient of resistance and arranged in good heat-exchange relation with said medium, a control resistor variable over a resistance range corresponding to the temperature range of said medium, a manually operable control device for selectively setting the resistance of said control resistor, a bridge circuit connecting said temperature-sensing resistor and said control resistor in paired relation and provided with a pair of input terminals and a pair of output terminals, a reactor, first means energized from said power source for supplying A.-C. power via said reactor to said input terminals, a reference conductor connected to one of said output terminals, a control conductor connected to the other of output terminals, a power conductor, second means energized from said power source for impressing an A.-C. voltage between said reference conductor and said power conductor, the condition of balance of said bridge being governed jointly by said temperature-sensing resistor and by said control resistor and said bridge establishing a corresponding variable A.-C. signal upon said control conductor that has a variable phase relation with respect to the voltage impressed upon said power conductor and that has a variable amplitude with respect to said reference conductor, and electron-controlled means governed jointly by the phase and by the sign and the amplitude of said signal for selectively controlling the supply of power from said source to said heating unit, so as to maintain the temperature of said medium substantially at that set by said control device.

References Cited in the file of this patent

UNITED STATES PATENTS

| | | |
|---|---|---|
| 1,535,307 | Hawk | Apr. 28, 1925 |
| 1,961,136 | Cretors | June 5, 1934 |
| 2,559,444 | Locke | July 3, 1951 |
| 2,819,371 | Aldrich et al. | Jan. 7, 1958 |
| 2,819,372 | Booker et al. | Jan. 7, 1958 |

OTHER REFERENCES

Electric Heater & Heating Devices; General Electric Co.; Schenectady N.Y. GED–650B; December 1941; page 21.